Figure 1:
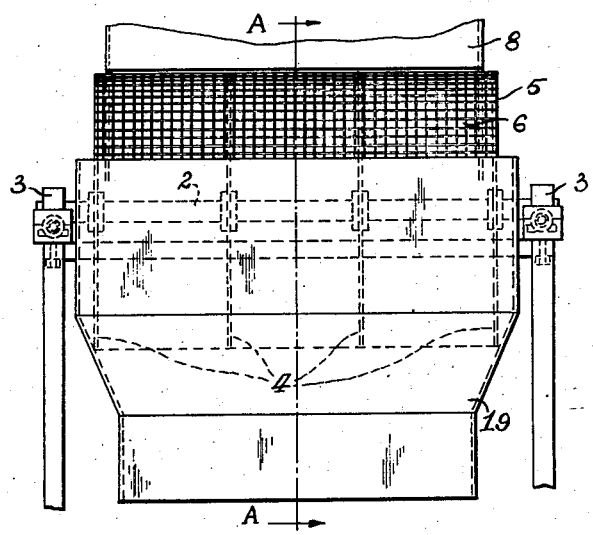

May 6, 1958      R. L. PERKS      2,833,481

METHOD OF BREAKING COMPRESSED ACETYLENE BLACK

Filed Sept. 15, 1955      2 Sheets-Sheet 1

INVENTOR
R. L. PERKS
BY Heatley & Morrison
AGENTS

May 6, 1958 R. L. PERKS 2,833,481
METHOD OF BREAKING COMPRESSED ACETYLENE BLACK
Filed Sept. 15, 1955 2 Sheets-Sheet 2
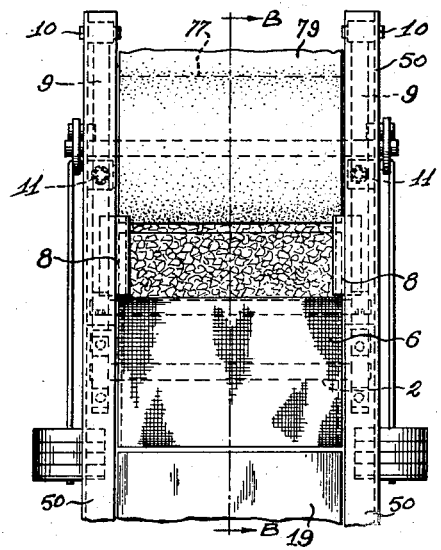
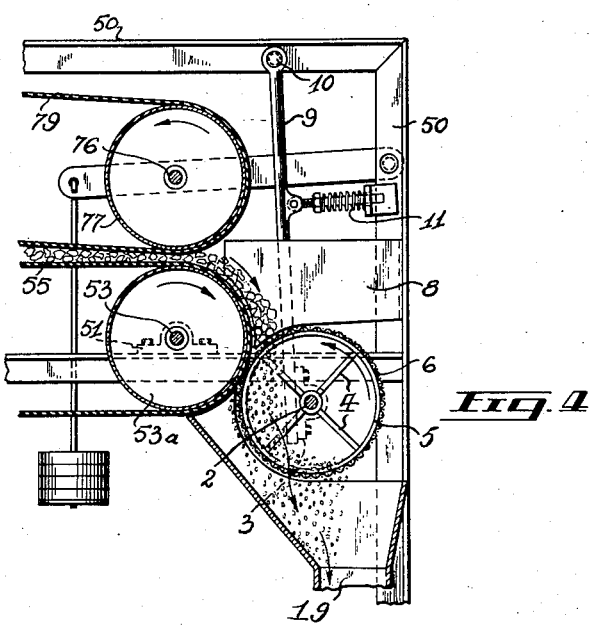
INVENTOR
R. L. PERKS
BY Heatley & Morrison
AGENTS

United States Patent Office 2,833,481
Patented May 6, 1958

2,833,481

METHOD OF BREAKING COMPRESSED ACETYLENE BLACK

Robert L. Perks, Shawinigan Falls, Quebec, Canada, assignor to Shawinigan Chemicals Limited, Montreal, Quebec, Canada, a corporation of Canada Application September 15, 1955, Serial No. 534,524

1 Claim. (Cl. 241—30)

This invention relates to a method for breaking down large friable fragments of material, particularly compressed acetylene black, into smaller fragments with a minimum of mechanical treatment.

The equipment which is described and claimed in U. S. Patent 2,415,355, when employed for the densification of certain finely divided materials, delivers the densified material in the form of friable plate-like lumps which are relatively thin and relatively large in length and breadth and which are inconvenient for further processing. For example, acetylene black which has been compressed in this device to a density of about six pounds per cubic foot contains lumps ranging in size from ½ inch x 1 inch x 2 inches to ¼ inch x 2 inches x 3 inches. When using this acetylene black for the manufacture of dry cells, particularly those of small sizes, lumps of these dimensions are troublesome in the mixing operation. Friable lumps of various other materials arise in various ways, e. g., the partial caking of powders or crystals during storage in kegs or bins.

There are many known devices for grinding lumps, e. g., ball or rod mills, but these are not suitable for grinding lumps of material which for various reasons must not be subjected to vigorous mechanical treatment; this is particularly true of acetylene black, the properties of which for use in dry cells would be substantially impaired by such treatment.

It is an object of this invention to provide a method for breaking friable lumps of compressed acetylene black into lumps of substantially smaller sizes with a minimum of mechanical treatment.

The invention thus consists of a method of breaking friable lumps of compressed acetylene black into fragments whose maximum dimension is not greater than three-quarters of an inch, without impairing the properties of said acetylene black, thereby rendering it suitable for use in the dry cell battery industry.

In accordance with this invention, this method is accomplished by a device comprising two cylindrical rolls with parallel horizontal shafts in a plane tilted from the horizontal at an angle ranging from zero to about 40 degrees, at least one of the said rolls being a hollow cylinder whose surface is uniformly perforated with openings occupying at least seventy percent, and preferably over seventy-five percent, of the surface area, said openings having a maximum dimension not exceeding about three quarters of an inch, means for driving at least one of the said rolls so that its upper surface rotates toward the other roll, and means for exerting a pressure tending to keep the faces of the two rolls in contact. The foregoing perforated surface constitutes a screen which also acts as a cutting mechanism for the friable material being processed. By its structure as a screen, it precludes the passage of lumps of material of size greater than the size of the apertures, and by its high proportion of open area in relation to the aperture size, the partitions between the apertures are thin enough to cut through lumps of friable material without exerting destructive shear on the material. The lumps to be broken are fed to the rolls and are broken into smaller lumps by being forced, by the rotation of the rolls, through the openings of the screen surface of the roll or rolls into the interior, whence they fall through the openings on the lower side of the roll, the passage out of the rolls being assisted by rotation.

Figure 2:
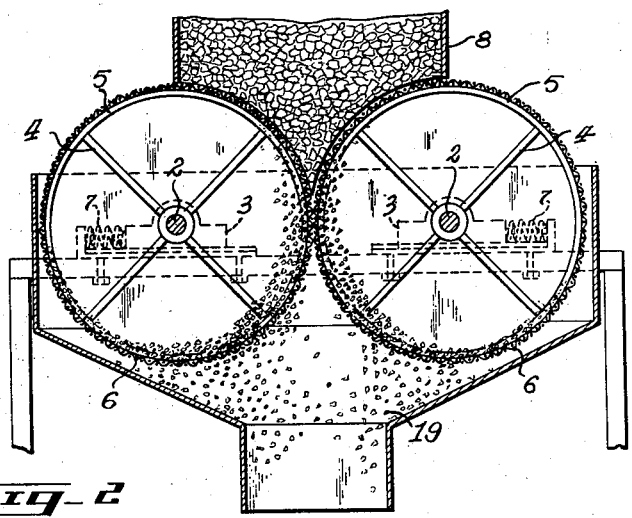

In the drawings which illustrate devices suitable for carrying out the method of the invention, Figure 1 is an elevation of a device employing two cylindrical screens, Figure 2 is a cross section on the line A—A of Figure 1, Figure 3 is an elevation of a device employing one cylindrical screen and Figure 4 is a cross section on the line B—B of Figure 3.

In Figures 1 and 2, the shafts 2 are supported in bearings 3 and one of the shafts is driven by means not shown. Spider frames consisting of radial arms 4 and circumferential members 5 are mounted on the shafts 2 and support the face of the roll which consists of a screen 6. Four springs 7, one at each end of each of the rolls, are attached to the bearings 3 and exert an adjustable pressure holding the faces of the rolls in contact. Spring pressure can be adjusted by various means, not shown, for example spacing washers, spring retractors, etc. The feed hopper 8 holds a supply of the lumps of material to be broken. A collecting hopper 19 of conventional design is mounted below the rolls.

The device illustrated in Figures 3 and 4 uses the lower front roll of the belt press shown in U. S. P. 2,415,355 as one of its rolls. Referring to the drawing, the frame 50 of the belt press (shown only in part), carries a bearing 51 in which is journalled the shaft 53 of the roll 53a over which passes the lower belt 55. The shaft 53 is driven by conventional means not shown. The upper belt 79 passes over roll 77 with its shaft 76 journalled in a bearing not shown. The second roll is of the same construction as the rolls in Figures 1 and 2. Its shaft is journalled in two bearings 3 mounted near the ends of tow similar hanging rods 9 pivoted on pins 10 which are mounted on frame 50. The screen surface 6 is pressed into contact with the belt 55 by the adjustable pressure exerted by the two compressed springs 11 mounted between the frame 50 and the hanging rods 9. The plane of the shafts 53 and 2 makes an angle of 37 degrees with the horizontal. The feed hopper consists merely of two sheets 8 mounted on the frame 50 and shaped so as to prevent the material delivered by the belt 55 from spilling off the ends of the nip between the belt 55 on the roll 53a and the surface of the screen 6. A collecting hopper 19 of conventional design is mounted below the rolls.

A device constructed in accordance with Figures 3 and 4 has been used in conjunction with the equipment shown in U. S. Patent 2,415,355 at column 6, lines 46–63. The screen was 14½ inches diameter and its length was that of the roll against which it operated. The steel wire of the screen was $\frac{1}{16}$ inch diameter and the openings were ½ inch x ½ inch. From these dimensions it can be seen that the open area of the screen constituted about 79% of the total surface. The lumps of acetylene black delivered by this equipment were originally in the size range from ½ inch x 1 inch x 2 inches to ¼ inch x 2 inches x 3 inches, and were broken by the method of the invention down to fragments whose maximum dimension was ½ inch and 99% of which had a maximum dimension under ¼ inch.

A screen made of $\frac{1}{16}$ inch diameter wire and $\frac{7}{16}$ inch square apertures would have a clear area of 76.4%. By simple calculation it can be observed that with $\frac{1}{16}$ inch diameter wire, a screen having apertures 0.319 inch square has a clear area of seventy percent of its surface, which is the minimum clear area necessary for purposes of this invention. Hence with $\frac{1}{16}$ inch diameter wire it is possible to use screens having aperture sizes between 0.319 and 0.75 inch square to achieve the desired cutting to break friable lumps with minimum shear and minimum mechanical treatment. With screens made of wire of larger diameter than 1/16 inch, the minimum size aperture providing seventy percent clear area would be greater than the minimum (0.319 inch) permissible with 1/16 inch wire screens. Similarly it can be calculated that the largest diameter wire that can be used in a screen to provide three-quarter inch apertures and seventy percent clear area in a screen surface is about 0.146 inch. Preferably, wires under one-tenth inch in diameter are used in screens for the method of this invention, to ensure maximum subdivision with minimum shearing, kneading, crushing, etc., of friable material while it is being broken down into smaller fragments which will pass through the screen. Various features of the devices as shown in the drawings may be replaced by their obvious mechanical equivalents. For example, the radial arms and the circumferential member may be replaced by a circular disk, with the shaft passing through its centre; as another example, the adjustable pressure may be applied by weights.

This application is a continuation-in-part of my earlier application S. N. 399,369 filed December 21, 1953, now abandoned.

What is claimed is:

A method of breaking friable lumps of compressed acetylene black into fragments whose maximum dimension is not greater than three-quarters of an inch, without impairing the properties of said acetylene black, thereby rendering it suitable for use in the dry cell battery industry, comprising passing the acetylene black into the nip between two counter-rotating cylindrical rolls with parallel horizontal shafts in a plane tilted from the horizontal at an angle within the range from zero to about 40°, at least one of said rolls being a hollow cylinder whose surface is uniformly perforated with openings occupying at least seventy percent of the surface area, said openings having a maximum dimension not exceeding about three-quarters of an inch, driving at least one of said rolls so that its upper surface rotates toward the other roll, maintaining a pressure sufficient to keep the faces of the two rolls in contact, and recovering acetylene black that has passed through the perforated surface.

References Cited in the file of this patent

UNITED STATES PATENTS

| | | |
|---|---|---|
| 179,612 | Root | July 4, 1876 |
| 342,811 | Root | June 1, 1886 |
| 909,133 | Baur | Jan. 12, 1909 |
| 1,143,135 | Rathbun | June 15, 1915 |
| 1,156,373 | Rhyther | Oct. 12, 1915 |
| 1,327,254 | Remmers | Jan. 6, 1920 |

FOREIGN PATENTS

| | | |
|---|---|---|
| 266,329 | Germany | Oct. 23, 1913 |

OTHER REFERENCES

"Chemical Engineers Handbook," Perry, Third Edition, page 960, Table 3.